(12) United States Patent
Griswold

(10) Patent No.: US 7,489,648 B2
(45) Date of Patent: *Feb. 10, 2009

(54) OPTIMIZING 802.11 POWER-SAVE FOR VLAN

(75) Inventor: Victor J. Griswold, North Canton, OH (US)

(73) Assignee: Cisco Technology, Inc.

( * ) Notice: Subject to any disclaimer, the term of this patent is extended or adjusted under 35 U.S.C. 154(b) by 636 days.

This patent is subject to a terminal disclaimer.

(21) Appl. No.: 10/798,040

(22) Filed: Mar. 11, 2004

(65) Prior Publication Data

US 2005/0201341 A1  Sep. 15, 2005

(51) Int. Cl.
G08C 17/00 (2006.01)
H04Q 7/24 (2006.01)
H04Q 7/00 (2006.01)
H04L 12/28 (2006.01)

(52) U.S. Cl. .............. 370/311; 370/338; 370/351; 370/328

(58) Field of Classification Search .......... 370/310, 370/338, 346, 352, 386, 389, 395.1, 447, 370/328, 392

See application file for complete search history.

(56) References Cited

U.S. PATENT DOCUMENTS

| 6,041,358 | A  | * | 3/2000  | Huang et al. ............. 709/238 |
| 6,067,297 | A  |   | 5/2000  | Beach |
| 7,126,945 | B2 | * | 10/2006 | Beach ...................... 370/389 |
| 7,245,946 | B2 | * | 7/2007  | Liu ........................ 455/574 |
| 7,362,757 | B2 | * | 4/2008  | Griswold et al. ........... 370/390 |
| 2002/0071449 | A1 | * | 6/2002  | Ho et al. .................. 370/447 |
| 2002/0150094 | A1 | * | 10/2002 | Cheng et al. .............. 370/389 |
| 2002/0159418 | A1 | * | 10/2002 | Rudnick et al. ............ 370/338 |
| 2003/0081625 | A1 |   | 5/2003  | Matsufuru |
| 2003/0193930 | A1 | * | 10/2003 | Wotherspoon et al. ...... 370/352 |
| 2003/0231588 | A1 |   | 12/2003 | Roth et al. |

FOREIGN PATENT DOCUMENTS

EP  1 311 086 A2  5/2003
WO  WO-02/054691 A2  7/2002

OTHER PUBLICATIONS

Int'l Search Report for Int'l Application No. PCT/US2005/001329, filed Jan. 18, 2005.
"Information technology—Telecommunications and information exchange between systems—Local and metropolitan area networks—Specific Requirements—Part 11: Wireless LAN Medium Access Control (MAC) and Physical Layer (PHY) specifications", XP-002207975, Reference No. ISO/IEC 8802-11:1999 (E), ANSI/IEEE Std 802.11, 1999 edition, pp. 123-137.

* cited by examiner

*Primary Examiner*—Hanh Nguyen
(74) *Attorney, Agent, or Firm*—Tucker Ellis & West LLP

(57) ABSTRACT

A method for an access point to provide immediate delivery of low-latency data packets to one virtual local area network when there are one or more associated stations operating in Power-Save-Protocol on another virtual local area network. The access point observes all the virtual local area networks to which it provides access to associated stations. The access point then determines which of the virtual local area networks contains only active stations. The access point then tracks the virtual local area network having only active stations and immediately transmits to the network incoming multicast/broadcast data packets.

27 Claims, 4 Drawing Sheets

ORGANIZE VLAN BY APPLICATION

ORGANIZE VLAN BY HARDWARE

OPTIMIZING 802.11 POWER-SAVE FOR VLAN

BACKGROUND

The present invention relates generally to wireless broadcast transmissions and more particularly to a method for optimizing the delivery of multicast and broadcast transmission packets, especially in an 802.11 network.

Unless otherwise defined herein, the terms in this specification should be interpreted as defined, or as customarily used, in the Institute of Electrical and Electronics Engineers (IEEE) 802.11 and 802.11e specifications. The IEEE 802.11 and IEEE 802.11e specifications are hereby incorporated by reference in their entirety. The current draft standard refers to the current draft supplement to the 802.11e specification, which is also hereby incorporated by reference.

An 802.11 wireless local area network (LAN) is based on a group or cellular architecture where the system is subdivided into basic units or cells. Each cell (called a Basic Service Set, or BSS, in the IEEE 802.11 nomenclature) is controlled by a base station, called an Access Point. Although a wireless LAN may be formed by a single cell, with a single access point, (or no access point), most installations will be formed by several cells, where the access points are connected through some kind of backbone (called Distribution System or DS). This backbone is typically Ethernet, but may be any other type of network, such as a token ring. The whole interconnected wireless LAN, including the different cells, their respective access points and the Distribution System, is seen as a single 802 network to the upper layers of the Open Systems Interconnection model and is known in the Standard as the Extended Service Set (ESS).

An optional power save mode, Power-Save Protocol (PSP), available under the IEEE 802.11 standard that a station can enter or leave, enables the station to conserve battery power when there is no need to send data. With power save mode on, the station indicates its desire to enter a "sleep" state to the access point via a status bit located in the header of each frame. The access point takes note of each station wishing to enter into power save mode and buffers packets corresponding to the sleeping station. In order to still receive data frames, the sleeping station must wake up periodically (at a synchronized time) to receive regular beacon transmissions coming from the access point. These beacons identify whether sleeping stations have frames buffered at the access point. After requesting and receiving the frames, the station can go back to sleep.

Pursuant to the IEEE standard, if a single 802.11 BSS station enters Power-Save Protocol (PSP) operation, the entire BSS adopts different characteristics in order to be able to provide services to the PSP station. Under normal network use (e.g. data latency-tolerant transmission) this PSP operation may not present a hardship. For example, PSP operation would cause a slight lag and delay in the transmission of multicast and broadcast packets, which would not be noticeable in data latency-tolerant transfer environments.

However, for transmissions of more urgency such as low-latency multicast, (e.g. voice-over-internet Protocol (VoIP), video), such a lag and delay time becomes noticeable and problematic to the application.

In a BSS where one of the stations has entered PSP operation, the BSS-wide characteristics will have changed to accommodate the PSP station. For example, in accordance with the IEEE standards relating to PSP operation, when a single BSS station enters PSP mode, all subsequent multicast and broadcast transmissions are queued by the AP and transmitted as a batch following the next 802.11 Data Traffic Indicator Mark (DTIM) beacon. During this transmission time, the access point takes a high priority stance in BSS transmissions, relegating all other transmissions to secondary status, until such time as the DTIM has been completed. In essence, all other traffic in the BSS, both to and from the access point, are effectively halted for the DTIM transmission.

Virtual networking refers to the ability of switches and routers to configure logical topologies on top of the physical network infrastructure allowing any arbitrary collection of LAN segments within a network to be combined into an autonomous station group, appearing as a single LAN. Virtual local area networks (VLANs) offer significant benefits in terms of efficient use of bandwidth, flexibility, performance, and security. VLAN technology functions by logically segmenting the network into different "broadcast domains" whereby packets are only switched between ports that are designated for the same VLAN. Thus, by containing traffic originating on a particular LAN only to other LAN's within the same VLAN, switched virtual networks avoid wasting bandwidth.

The VLAN approach also improves scalability, particularly in LAN environments that support broadcast- or multicast-intensive protocols as well as other applications that flood packets throughout the network.

A problem associated with access points conforming minimally to the 802.11 protocol is that if there is a single station in PSP mode associated to an access point, all multicast frames on all VLANs are buffered and transmitted immediately following an 802.11 DTIM beacon. Accordingly, higher-priority Quality-of-Service unicast transmissions may be delayed for the duration of the multicast delivery period. Power-save stations must stay awake, for the duration of the multicast delivery period, to receive multicast transmissions. As a result, multicast transmissions can reduce battery life in power-save stations. Additionally, stations not in PSP operation and subscribed to low-latency multicast streams must wait for delivery of those multicasts.

In other words, assume station A and station B are both clients of an 802.11 access point. Further, assume that station A enters into 802.11 PSP operation while station B remains in active operation. In the event that station B subscribes to an IP multicast group, the 802.11 access point will buffer the IP multicast stream to compensate for station A being in PSP mode, even though station A is not a subscriber to the IP multicast group. Taking this example further, assume that station A is in VLAN 1 and station B is in VLAN 2, holding all other variables as in the preceding example. Since both station A and station B are clients of the same 802.11 access point, while station A is in PSP mode, transmissions to station B are buffered to compensate for the station A PSP operation. Thus, even though the stations are on different respective VLANs, transmissions must still be buffered because of the PSP mode of station A.

Thus, there exists a need for a system and method which may be suitably configured to immediately transmit low-latency multicasts/broadcasts to VLANs containing only active stations.

SUMMARY OF INVENTION

The present innovation disclosed and claimed herein, in one aspect thereof, comprises a system and method for an access point to provide superior Quality-of-Service to a plurality of stations when those stations are grouped into virtual local area networks. In one embodiment, the access point may be an IEEE 802.11 access point and the station may be a portable personal computer or a personal digital assistant.

In accordance with the present invention, there is provided a method for an access point to provide the immediate delivery of multicast/broadcast data packets to at least one of a plurality of virtual local area networks. The access point observes all the virtual local area networks for which at least one station associated with the access point belongs. All stations associated with a particular virtual local area network are then determined to support low-latency data transmission, or otherwise stated as in constantly active mode. The access point then identifies the virtual local area networks determined to have only constantly active stations, i.e., those stations supporting low-latency data transmission. The access point will then transmit immediately, all incoming multicast/broadcast data packets destined for a virtual local area network having all associated stations operating in constantly active mode. Each virtual local area network with all stations supporting low-latency data transmission thereby receive such transmissions immediately.

One aspect of the present method provides the step of identifying at least one of the virtual local area networks which has at least one station associated with the access point supporting high-latency data packets, that is, operating in power-save protocol operation. Yet another aspect of the present method provides the step of buffering data packets for the virtual local area network having at least one associated station operating in power-save protocol operation.

Further in accordance with the present invention, in a network comprising at least one access point, a plurality of virtual local area networks and a plurality of associated stations, there is provided a system for automatically optimizing delivery of low-latency data packets over at least one of the virtual local area networks. The system includes means adapted for monitoring, at the access point, all virtual local area networks which have at least one station associated with the access point. The system further includes means adapted for determining, on one of the virtual local area networks, all associated stations that support low-latency data transmission. The system comprises means adapted for identifying the virtual local area network having all associated stations supporting low-latency data transmission. The system also comprises means adapted for transmitting immediately, all multicast/broadcast data packets destined for the virtual local area network having all associated stations supporting low-latency data transmission, i.e., all stations are operating in constantly active mode.

One aspect of the present system provides means adapted for identifying at least one virtual local area network having at least one associated station supporting high-latency data packets. Yet another aspect of the present system provides means adapted for buffering data packets for the virtual local area network having at least one associated station operating in power-save protocol operation, i.e., a station supporting only high-latency data packet transmissions.

Still further in accordance with the present invention, there is provided a computer program product having a computer readable medium having computer program logic recorded thereon for performing a computer implemented method for an access point to provide immediate delivery of low-latency data packets to at least one of a plurality of virtual local area networks. The computer implemented method includes the step of monitoring, at the access point, all virtual local area networks comprising at least one station associated with the access point. The computer implemented method further includes the step of determining, on at least one of the virtual local area networks, that all associated stations support low-latency data transmission, i.e., all associated stations are operating in constantly active mode. The computer implemented method then provides the step of identifying the virtual local area network having all associated stations operating in constantly active mode. The computer implemented method further provides for transmitting multicast/broadcast data packets immediately to the virtual local area network having all associated stations operating in constantly active mode.

One aspect of the computer implemented method provides the step of identifying at least one virtual local area network having at least one associated station supporting high-latency data packets. Yet another aspect of the present computer implemented method provides the step of buffering the data packets for the at least one virtual local area network having the at least one associated station in power-save protocol operation. The buffered data packets are subsequently transmitted with the next data traffic indicator mark.

Still other objects and aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE EMBODIMENTS

The following includes examples of various embodiments and/or forms of components that fall within the scope of the present system that may be used for implementation. Of course, the examples are not intended to be limiting and other embodiments may be implemented without departing from the spirit and scope of the invention.

Figure 1:
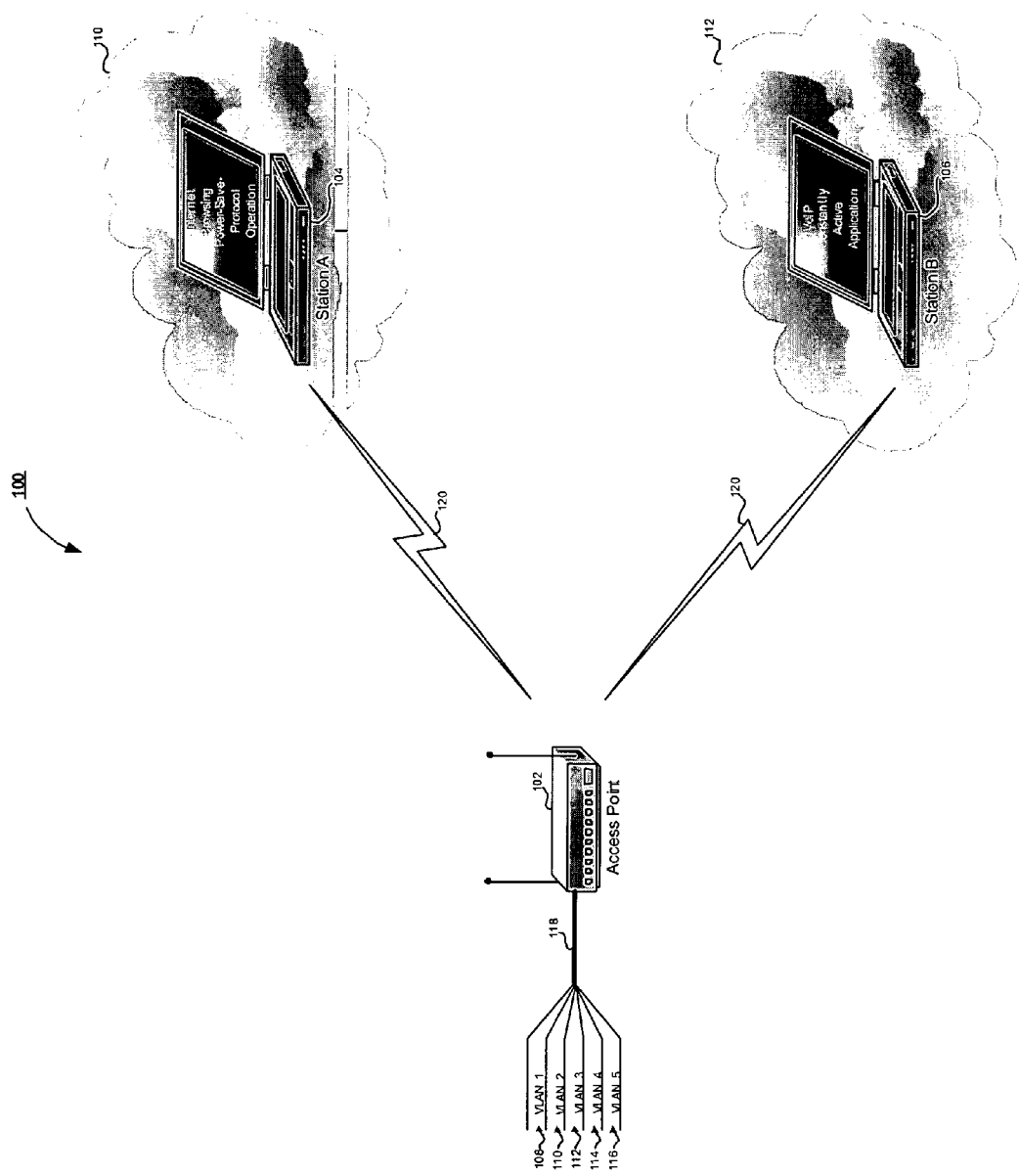
FIG. 1 is a diagram illustrative of a typical VLAN 802.11 network.

Referring now to FIG. 1, there is shown a representation of an 802.11 system 100 utilizing virtual local area network (VLAN) organization. In a typical 802.11 system 100, stations 104 and 106 are generally categorized into VLANs according to both their security requirements and their application mix. Such categorization is well known in the art and the skilled artisan will appreciate the present invention takes advantage of such categorization of 802.11 stations operating on VLANs in an 802.11 network. Returning to FIG. 1, there is shown an access point 102 in communication with two stations 104 and 106. Communication is accomplished via radio channel 120. A wired backbone 118 may be any suitable wired local area network (LAN) as is known in the art, including, but not limited to Ethernet and token ring. The wired backbone 118, as shown in FIG. 1, contains a plurality of VLANs, VLAN 1 108, VLAN 2 110, VLAN 3 112, VLAN 4 114 and VLAN 5 116. The skilled artisan will appreciate that the use of five VLAN designations is for exemplary purposes only and the application of the present invention need not be so limited.

FIG. 1 demonstrates Station A 104 operating on VLAN 2 110 and Station B 106 operating on VLAN 3 112. The assignment to a specific VLAN occurs upon association of a station to an access point. As shown in FIG. 1, Station A 104 associated with the access point 102 and was subsequently assigned to VLAN 2 110. Those skilled in the art will appreciate that the assignment of Station A 104 to VLAN 2 110 generally resulted from the particular type of application mix running on Station A 104 at the time of association with the access point 102. As shown in FIG. 1, Station A 104, at the time of association, was running an Internet browser and thereby operating in Power-Save Protocol mode.

In a similar manner, Station B 106 associated with the access point 102 and it was determined that the application mix then running on Station B 106 merited assignment to VLAN 3 112. As shown in FIG. 1, Station B 106, at the time of association with access point 102, was running a Voice-over-Internet Protocol (VoIP) application, thereby operating in continuously active mode. It will be appreciated by those skilled in the art that the assignment to a specific VLAN need not be based solely on application mix of the associating station. The skilled artisan will understand that device/hardware type, such as personal data assistant, docked or undocked laptop, personal computer, or the like, may also bear on which VLAN the authentication server will assign the associating station. Similarly, security access controls may dictate VLAN assignment. As used herein, application mix is exemplary only and other bases for assignment may be substituted herein without affecting the functionality of the present invention.

Figure 2:
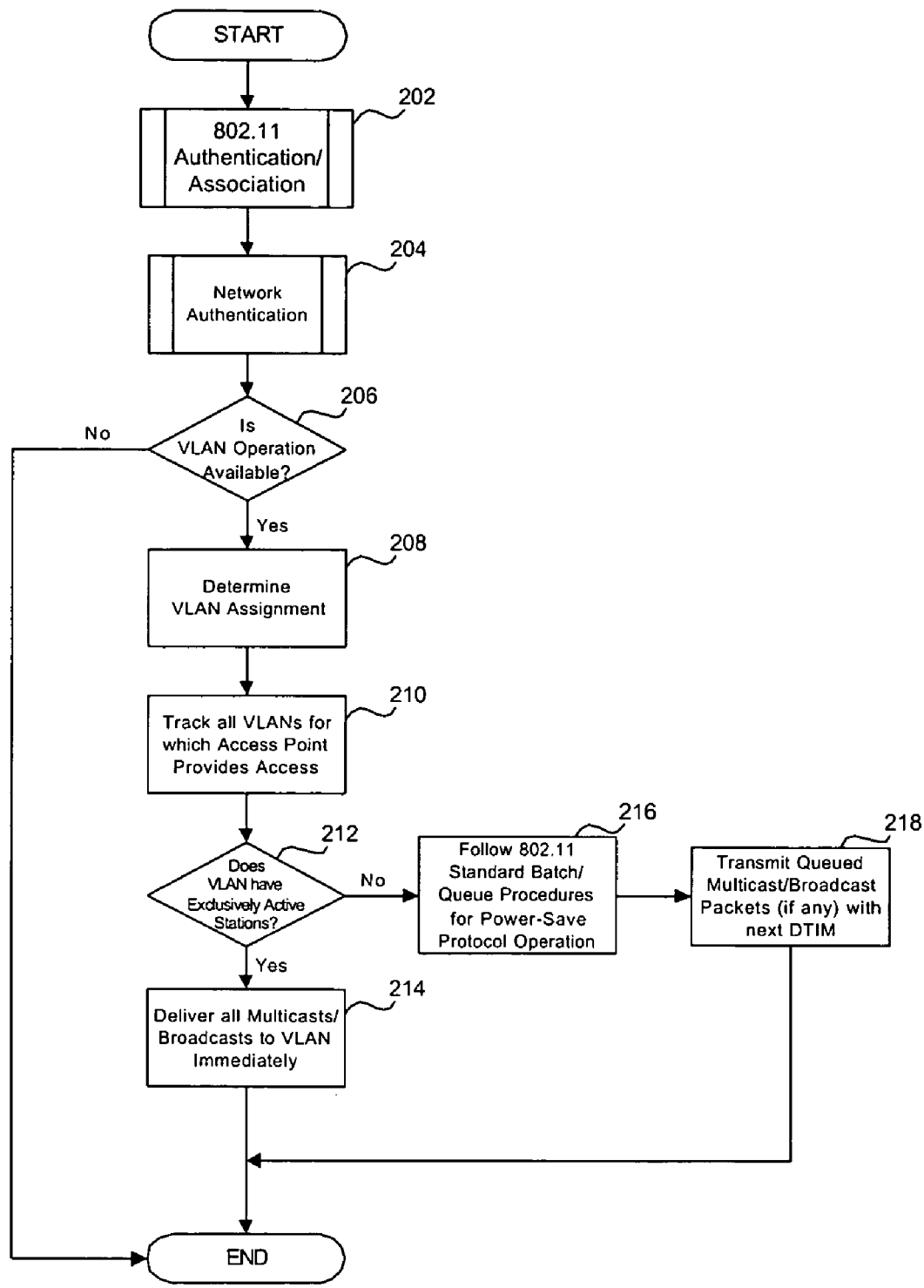
FIG. 2 is a flow chart illustrating the present invention in operation on an 802.11 network.

Referring now to FIG. 2, there is shown the method of the present invention, wherein low-latency data packets are immediately transmitted to those VLANs containing only constantly active stations. 802.11 Authentication of a station, at 202, occurs when a station has located an access point and decides to join the access point's basic service set. At step 202, both the access point and the station exchange information, which results in verification of the identity of the station. Once the station has been authenticated, an exchange of information regarding the capabilities of the basic service set and the station, called association, occurs at step 202. The 802.11 association process of step 202 allows the set of access points comprising the network to know about the current position of the station. A station is capable of transmitting and receiving data frames only after the association process is completed. Following the authentication and association of step 202, the station is then authenticated with the network for which the access point provides connection to the station. This occurs at step 204, where network authentication occurs. It will be appreciated by those skilled in the art that any suitable method of network authentication will enable the subject invention to operate, including, but not limited to, password-based authentication algorithms.

The method continues to step 206, where a determination is made that the 802.11 network on which the access point resides supports VLAN operations. In the event that at step 206, the system does not support VLAN operations, the method terminates and the station is ready to join the basic service set of the access point. Returning to a positive determination in step 206, the method progresses to step 208, when the access point determines the VLAN assignment of the associating station. It will be appreciated by those skilled in the art that the assignment of any particular station occurs during the association/authentication process and the description contained herein is for demonstrative purposes. The skilled artisan will understand that the assignment to a particular VLAN will depend upon the organization of the network and not any dynamic decision by the access point to which the station is associating.

Upon the determination of a VLAN assignment at step 208, the access point proceeds, at step 210, to track all VLANs for which the access point provides access to associated stations. Thus, the access point monitors all VLANs on which it has associated stations assigned. The access point then determines, at step 212, that all the associated stations operating on a particular VLAN are in constantly active mode. That is, the access point monitors its associated stations, realizing that all stations on a given VLAN are operating in a continuously active state. For example, the stations assigned to the given VLAN and associated with the access point may all be running a multimedia presentation, transmitting VoIP, or the like. Upon such a determination at step 212, the access point delivers immediately all multicasts/broadcasts to the VLAN having only constantly active stations at step 214. Thus contrary to 802.11 standards, the access point will immediately transmit multicasts/broadcasts to the given VLAN, even if other stations operating on other VLANs, but belonging to the access point's basic service set, are operating in PSP.

Returning to step 212, the access point determines that the VLAN for which the station has been assigned does not have only active stations. The access point then proceeds to step 216, where the incoming multicast/broadcast data packets are batched and queued in accordance with standard 802.11 PSP operations. The queued multicast/broadcast data packets are then transmitted with the next Data Traffic Indicator Mark (DTIM) beacon at step 218. To state another way, if the VLAN for which the newly associated station has been assigned has even one station operating in PSP, all incoming multicast/broadcast packets for that VLAN are batched and queued until the next DTIM.

Figure 3:
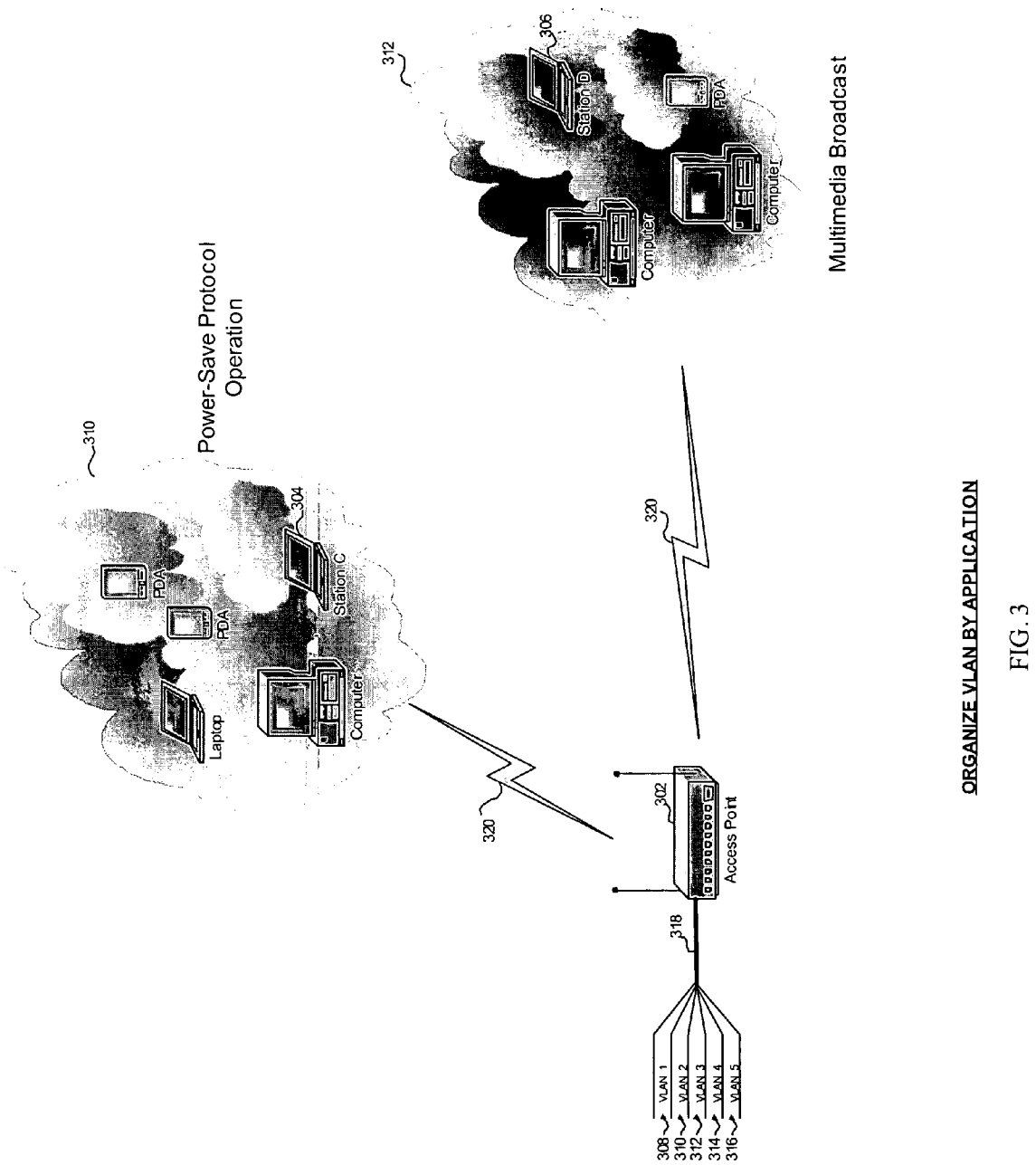
FIG. 3 is a diagram illustrating the present invention in operation on VLANs organized by application mix on an 802.11 network.
Figure 4:
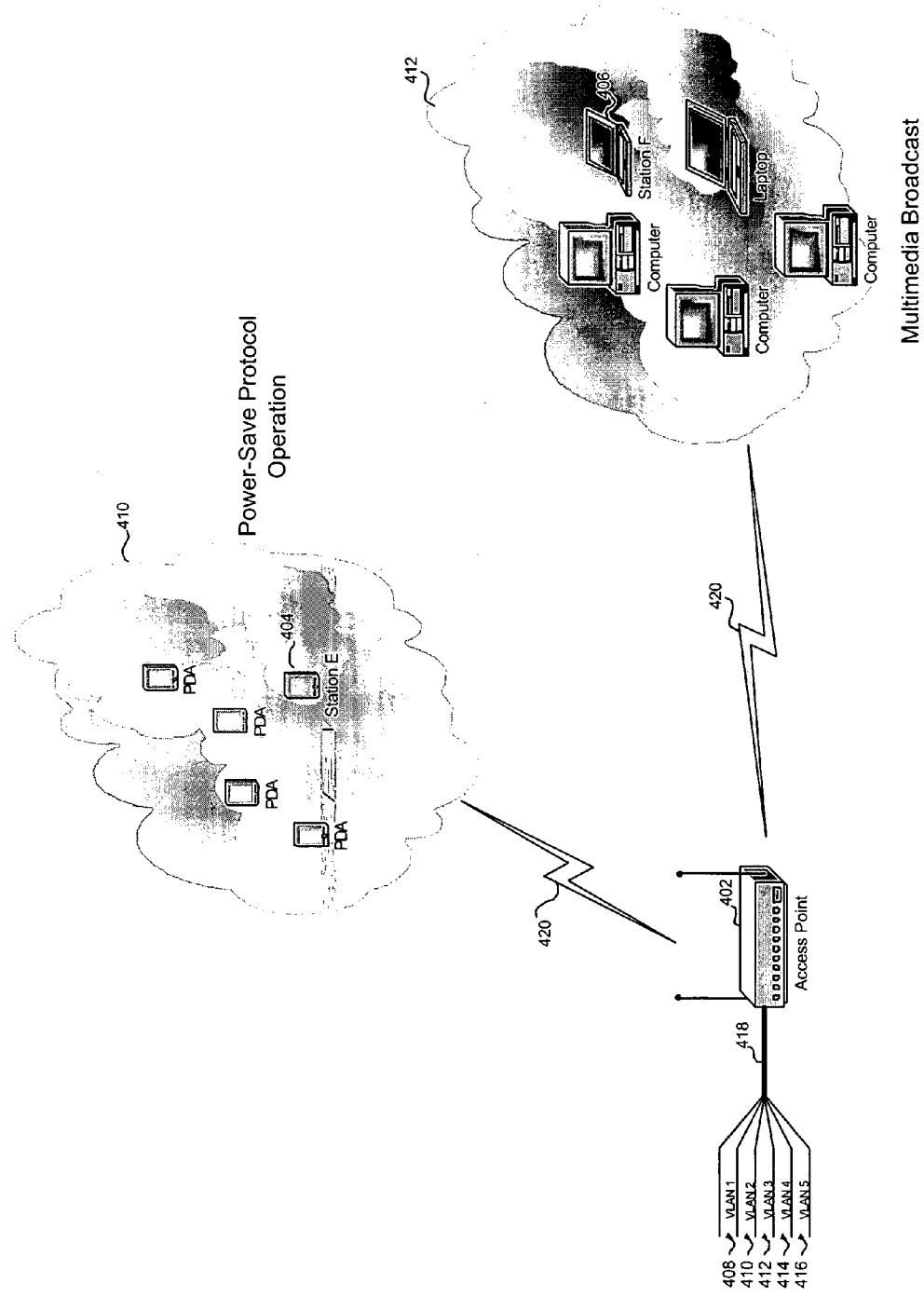
FIG. 4 is a diagram illustrating the present invention in operation on VLANs organized by device/hardware mix on an 802.11 network.

FIGS. 3 and 4 will now be used to demonstrate an application of the subject invention to both an application based categorization by an authentication server, as well as a device based categorization.

Referring now to FIG. 3, there is shown an exemplary multiple VLAN system operating on an 802.11 wireless network, with each VLAN representing a different application mix. As shown, Station C 304 is in PSP operation on VLAN 2 310 while Station D 306 operates in constantly active mode on VLAN 3 312. The access point 302 transmits to VLAN 2 310 and VLAN 3 312 over communications channel 320. The access point 302 is connected to a local area network (not shown) via backbone 318. Contained within backbone 318 are the logical VLANs 1-5, reference numbers 308 through 316, respectively. As demonstrated in FIG. 3, upon association, the respective devices have been organized by application mix, with VLAN 2 310 containing those devices operating latency-tolerant applications, that is, applications that do not require immediate transmission of multicast/broadcast data packets. For example, the devices on VLAN 2 310 may be, but need not be limited to, operating Internet browsers, word processing or other latency-tolerant applications.

VLAN 3 312, in contrast, represents those devices operating low-latency applications, that is, applications having a need for high Quality-of-Service. For example, such applications may be, but need not be limited to, Voice-over-Internet-Protocol, multimedia streams, or broadcast streams. In standard operation, the Power-Save-Protocol operation of VLAN 2 310 would require the access point 302 to hold all multicast/broadcast transmissions, such as VoIP, until the next DTIM. That is, all multicast/broadcast transmissions to stations belonging to the Basic Service Set (BSS) of the access point 302 would be batched and queued until the next DTIM beacon. This results in a low Quality-of-Service, with a detectable lag time between multicast/broadcast transmissions by all stations requiring low-latency data packet transmissions.

However, when applying the present invention, the PSP operation of Station C 304 on VLAN 2 310 has no effect on the transmission of multicasts/broadcasts to Station D 306 operating on VLAN 3 312. Assuming that authentication and association have already occurred, i.e., access point 302 has assigned Station C 304 to VLAN 2 310 and Station D 306 has been assigned to VLAN 3 312, the access point 302 then tracks both VLAN 2 310 and VLAN 3 312 because the access point 302 has associated stations, Station C 304 and Station D 306, operating on VLAN 2 310 and VLAN 3 312, respectively. The access point 302 then determines that one of the devices in VLAN 2 310 is operating in PSP, for purposes of this example, Station C 304 is currently operating in PSP. Thus, the access point 302 will identify VLAN 2 310 as having an associated station in PSP mode and will buffer and queue all incoming multicast/broadcast data packets for any device operating on VLAN 2 310 until transmission of the next DTIM beacon.

Concurrently, the access point 302 is also tracking VLAN 3 312, monitoring the devices operating on VLAN 3 312. The access point 302 identifies VLAN 3 312 as having all associated stations on VLAN 3 312 in a constantly active mode. Applying the present invention, the access point 302, realizing that all its associated stations operating on VLAN 3 312 are constantly active, i.e., not in PSP, the access point 302 immediately transmits all multicasts/broadcasts designated for VLAN 3 312 to the VLAN. This occurs irrespective of one or more associated stations operating in PSP, provided such other associated stations are not assigned to VLAN 3 312. It will be appreciated by those skilled in the art that the use of only two VLANs in the foregoing example is demonstrative only, and the subject application need not be so limited.

Turning now to FIG. 4, there is shown an exemplary multiple VLAN system operating on an 802.11 wireless network. As shown, Station E 404, represented as a personal data assistant, is in PSP operation on VLAN 2 410. In contrast, Station F 406, represented by a laptop computer, is in constantly active mode operation on VLAN 3 412. The access point 402 transmits to both VLAN 2 410 and VLAN 3 412 over communications channel 420. The access point 402 is connected to a local area network (not shown) via backbone 418. Located within the local area network are the logical VLANs 1-5, designated by reference numbers 408 through 416, respectively. Each VLAN 408-416 exists independent of the access point 402 and each other.

FIG. 4 demonstrates an alternate method of assigning associating stations to a VLAN based upon the hardware/device type of the station. As shown in FIG. 4, VLAN 2 410 consists of personal data assistants, including Station E 404. Thus, VLAN 2 410 has been designated as the VLAN for which all personal data assistants associating with the 802.11 network should be assigned. The benefits of grouping such similar types of hardware on the same VLAN are well known in the art. In a similar manner, VLAN 3 412 has been designated as the VLAN for which all associating personal computers, including Station F 406, should be assigned. It will be appreciated by those skilled in the art that the designation of all personal data assistants to one VLAN and all personal computers to another VLAN is for exemplary purposes only. The skilled artisan will appreciate that the division of hardware depicted in FIG. 4 may be further delineated to separate VLANs for docked laptops versus undocked laptops versus workstations and the like.

In standard operation, the Power-Save-Protocol operation of the personal data assistants of VLAN 2 410 would require the access point 402 to hold all multicast/broadcast transmissions, such as VoIP, until the next DTIM beacon. Standard 802.11 operations require that in the event that even one station belonging to an access point's BSS operating in PSP, all multicast/broadcast transmissions for the BSS are batched and queued. That is, all multicast/broadcast transmissions to stations belonging to the BSS of the access point 402 would be batched and queued until the next DTIM beacon. During this period, transmission of the DTIM, the access point 402 takes a high-priority in BSS transmissions, effectively halting all other transmissions in the BSS. This results in a low Quality-of-Service, with a detectable lag time between transmissions by all stations requiring low-latency data packet transmissions.

The application of the method of the present invention, as described above with reference to FIG. 2, enables the immediate transmission of all data packets to the stations of VLAN 3 412 including Station F 406, bypassing the PSP operation of Station E 404 on VLAN 2 410, or any other station of VLAN 2 410. Using the assumption that access point 402 has assigned Station E 402 to VLAN 2 410 and Station F 406 has been assigned to VLAN 3 412, the access point 402 then tracks both VLAN 2 410 and VLAN 3 412 because the access point 402 has associated stations, Station E 404 and Station F 406, operating on VLAN 2 410 and VLAN 3 412, respectively. The access point 402 then determines that one of the devices in VLAN 2 410 is operating in PSP, for purposes of this example, Station E 404 is currently operating in PSP. Thus, the access point 402 will identify VLAN 2 410 as having at least one associated station in PSP operation and will buffer and queue all incoming multicast/broadcast data packets for any device operating on VLAN 2 410 until transmission of the next DTIM.

Concurrently, the access point 402 is also tracking VLAN 3 412, monitoring the devices operating on VLAN 3 412. The access point 402 then identifies VLAN 3 412 as a VLAN having only constantly active stations. Applying the present invention, the access point 402, realizing that all its associated stations operating on VLAN 3 412 are constantly active, i.e., not in PSP, the access point 402 immediately transmits all multicasts/broadcasts designated for VLAN 3 412 to the VLAN. This occurs irrespective of one or more associated stations operating in PSP, provided such other associated stations are not assigned to VLAN 3 412. Thus the PSP versus Active operational mode of one category of devices/applications has a greatly diminished effect on the Quality-of-Service for other categories of devices/applications. It will be appreciated by those skilled in the art that the use of only two VLANs in the foregoing example is demonstrative only, and the subject application need not be so limited.

While the present system has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the system, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for an access point having a basic service set comprising a plurality of associated stations operating in a plurality operative modes to provide immediate delivery of low-latency multicast/broadcast data packets to at least one of a plurality of virtual local area networks, the steps comprising:

monitoring, at the access point, all virtual local area networks comprising at least one station associated with the access point;

determining, for each monitored virtual local area network, those virtual local area networks having all associated stations operating in active mode;

identifying, via the access point, the at least one virtual local area network having all associated stations in active mode operation; and transmitting low-latency multicast/broadcast data packets immediately to the at least one identified virtual local area network;

wherein the basic service set includes at least one associated station operating in power-save mode.

2. The method of claim 1, wherein the access point is an 802.11 access point.

3. The method of claim 1, wherein each station in active mode is in 802.11 constantly active operation supporting low-latency data transmission.

4. The method of claim 1, further comprising the step of identifying at least one virtual local area network having the at least one associated station operating in power-save mode.

5. The method of claim 4, wherein each associated station operating in power-save mode is in 802.11 power-save protocol operation.

6. The method of claim 5, further comprising the step of buffering the multicast/broadcast data packets for the at least one virtual local area network having the at least one associated station in power-save protocol operation.

7. The method of claim 6, further comprising the step of transmitting the buffered multicast/broadcast data packets with a data traffic indicator mark.

8. The method of claim 1, wherein the associated station is a portable personal computer.

9. The method of claim 1, wherein the associated station is a personal data assistant.

10. In a network comprising at least one access point, a plurality of virtual local area networks and a plurality of associated stations in an associated basic service set operating in a plurality of operative modes, a system for automatically optimizing delivery of low-latency multicast/broadcast data packets over at least one of the virtual local area networks, comprising means for monitoring, at the access point, all virtual local area networks comprising at least one station associated with the access point;

means for determining, for each monitored virtual local area network, those networks having all associated stations operating in active mode;

means for identifying, via the access point, at least one virtual local area network having all associated stations in active mode operation; and means for transmitting low-latency multicast/broadcast data packets immediately to the at least one identified virtual local area network;

wherein the basic service set includes at least one associated station operating in power-save mode.

11. The system of claim 10 wherein the access point is an 802.11 access point.

12. The system of claim 10 wherein associated station in active mode is in 802.11 constantly active operation supporting low-latency data transmission.

13. The system of claim 10, further comprising means for identifying at least one virtual local area network having at the least one associated station operating in power-save mode.

14. The system of claim 13, wherein each associated station operating in power-save mode is in 802.11 power-save protocol operation.

15. The system of claim 14, further comprising means for buffering the multicast/broadcast data packets for the at least one virtual local area network having the at least one associated station in power-save protocol operation.

16. The system of claim 15, further comprising means for transmitting the buffered multicast/broadcast data packets with a data traffic indicator mark.

17. The system of claim 10, wherein the associated station is a portable personal computer.

18. The system of claim 10, wherein the associated station is a personal data assistant.

19. A computer program product having a computer readable medium having computer program logic recorded thereon for performing a computer implemented method for an access point having a basic service set comprising a plurality of associated stations in a plurality of operative modes to provide immediate delivery of low-latency data packets to at least one of a plurality of virtual local area networks, the steps comprising:

monitoring, at the access point, all virtual local area networks comprising at least one station associated with the access point;

determining, for each monitored virtual local area network, those networks having all associated stations operating in active mode;

identifying, via the access point, at least one virtual local area network having all associated stations in active mode operation; and transmitting low-latency multicast/broadcast data packets immediately to the at least one identified virtual local area network;

wherein the basic service set includes at least one associated station operating in power-save mode.

20. The computer implemented method of claim 19, wherein the access point is an 802.11 access point.

21. The computer implemented method of claim 19, wherein each station in active mode is in 802.11 constantly active operation supporting low-latency data transmission.

22. The computer implemented method of claim 19, further comprising the step of identifying at least one virtual local area network having the at least one associated station operating in power-save mode.

23. The computer implemented method of claim 22, wherein each associated station operating in power-save mode is in 802.11 power-save protocol operation.

24. The computer implemented method of claim 23, further comprising the step of buffering the multicast/broadcast data packets for the at least one virtual local area network having the at least one associated station in power-save protocol operation.

25. The computer implemented method of claim 24, further comprising the step of transmitting the buffered multicast/broadcast data packets with a data traffic indicator mark.

26. The computer implemented method of claim 19, wherein the associated station is a portable personal computer.

27. The computer implemented method of claim 19, wherein the associated station is a personal data assistant.

* * * * *

UNITED STATES PATENT AND TRADEMARK OFFICE
CERTIFICATE OF CORRECTION

PATENT NO. : 7,489,648 B2  
APPLICATION NO. : 10/798040  
DATED : February 10, 2009  
INVENTOR(S) : Victor J. Griswold It is certified that error appears in the above-identified patent and that said Letters Patent is hereby corrected as shown below:

In Claim 1, Column 8, Line 54, please replace "plurality operative modes" with --plurality of operative modes--.

In Claim 12, Column 9, Line 51, please replace "wherein associated" with --wherein the associated--.

In Claim 13, Column 9, Lines 55-56, please replace "having at the least" with --having the at least--.

Signed and Sealed this

Thirty-first Day of March, 2009

JOHN DOLL  
*Acting Director of the United States Patent and Trademark Office*